C. C. BLACKMORE.
VEHICLE CURTAIN SUPPORT.
APPLICATION FILED JAN. 6, 1910.
985,105.
Patented Feb. 21, 1911.
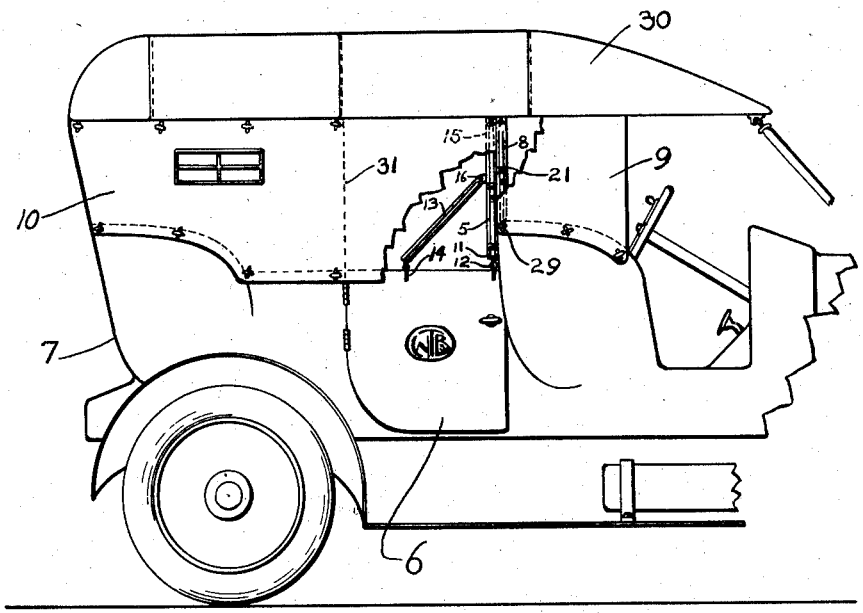
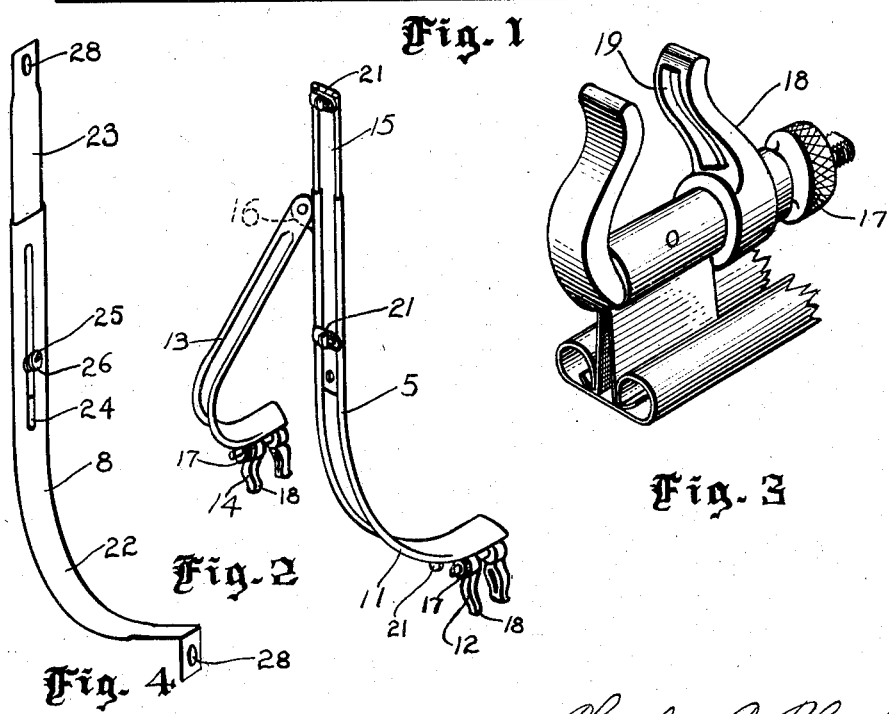
Witnesses
W. Thornton Bogert
B. R. Kropff
Inventor
Charles C. Blackmore
By Walter D. Murray
Attorney

UNITED STATES PATENT OFFICE.

CHARLES C. BLACKMORE, OF CINCINNATI, OHIO.

VEHICLE-CURTAIN SUPPORT.

985,105.  Specification of Letters Patent.  Patented Feb. 21, 1911.

Application filed January 6, 1910. Serial No. 536,696.

*To all whom it may concern:*

Be it known that I, CHARLES C. BLACKMORE, a citizen of the United States of America, and resident of Cincinnati, Hamilton county, State of Ohio, have invented certain new and useful Improvements in Vehicle-Curtain Supports, of which the following is a specification.

This invention relates to side curtains for automobiles or other vehicles, and particularly to means for supporting removable curtains, so that they will swing back with the vehicle door. No special arrangement is made in automobiles with removable tops or with removable curtains for swinging the side curtains back when the door of the automobile is opened. The curtains are unfastened with difficulty, and the chauffeur ordinarily has to get out to do it.

An object of my invention is to provide means for firmly holding removable side curtains in place, when the door of the automobile or vehicle is closed, and for swinging back a portion of one of the side curtains with the door, when the door is opened.

A further object is to produce adjustable and removable means for holding the removable curtains of an automobile or other vehicles in place.

These and other objects I attain by means of the apparatus illustrated in the drawings accompanying this application and forming a part thereof.

Figure 1 is a partial side elevation of an automobile, equipped with an embodiment of my invention. Portions of the side curtains are shown cut away, for the convenience of illustration. Fig. 2 is a perspective view of a curtain support, which forms a detail of the illustrated embodiment of my invention. Fig. 3 is a perspective view showing a clamp which forms a detail of the apparatus illustrated. Fig. 4 is a perspective view of a curtain supporting element, which coöperates with the support shown in Fig. 1.

The illustrated embodiment of my invention consists of an upright or curtain support 5 mounted on the door 6 of an automobile 7 and coöperating with a curtain support member 8 secured to the automobile body and to the edge of an adjacent curtain 9. The forward edge of a curtain 10 is secured to the upright 5. The upright 5 and the coöperating member 8 are both adjustable, so that they may be placed on vehicles of different heights, and also that they may be folded and caused to occupy a minimum space when removed from the vehicle and packed away with the removable curtains.

The upright 5 consists of a base portion 11, which is provided with a clamp 12, a brace 13, provided with a clamp 14, and a movable extension 15, which is adjustably mounted on the base portion 11. The clamps 12 and 14 are adapted to secure the upright 5 to the door of the vehicle and are made adjustable, so that they may fit any vehicle door, and also that they may be removably secured in place on the door. The brace 13 is pivotally secured to the bracket 16, which is secured to or formed integrally with the base portion near its top. The clamps 12 and 14 may be stamped or formed in any suitable manner and each clamp is secured in place on the door of the vehicle by means of a thumb screw 17, which engages a movable prong 18 and draws the clamp into clutching engagement with the edge of the vehicle door. A strip of felt or other soft material 19 is provided on each prong of the clamps, so that the wood work of the car will not be marred. Suitable curtain fasteners 21 are secureed to the base portion 11 of the upright and the extension 15, for securing the edge of the curtain 10 in place.

The member 8 consists of a base piece 22 and a movable extension 23 adjustably secured thereto. The extension 23 is similar to the extension 15 of the upright 5 and fits into a way, which extends longitudinally of the base piece 22. A slot 24 is provided in the base piece 22 and a screw 25, secured to the extension 23, projects through it. A milled-head nut 26 is threaded onto the screw 25 and is adapted to clamp the extension 23 in place on the base piece 22. The extension of the upright 5 is secured to the base portion by similar means. The lower end of the base piece 22 of the member 8 is provided with an opening 28, which is adapted to engage the curtain fastener 29, located on the body 7 of the vehicle. The upper end of the extension 23 is also provided with a similar opening 28, which is adapted to engage a curtain fastener provided on the top 30 of the vehicle. One or more curtain fasteners 21 may be provided on the member 8 for engaging the edge of the curtain 9.

The member 8 and the curtain 9 are both secured in place on the vehicle, and then the edge of the curtain 9 is secured to the member 8, by means of the intermediate curtain fasteners 21. The upright 5 is secured in place on the door, and then the forward edge of the curtain 10 is secured to it. The curtain fasteners are so located on the vehicle and on the top 30, that the forward portion of the curtain 10 can swing back with the door, when the door is opened, by folding or creasing along the dotted line 31. The front portion of the curtain 10 is secured to the upright 5, by means of the curtain fasteners 21. With this arrangement, the edges of the curtains 9 and 10 are held firmly in place adjacent to each other, when the door is closed, and the difficulty encountered with ordinary side curtains when the door is opened, is overcome.

When the curtains and the support members 5 and 8 are removed, the member 8 is reduced to its minimum size by telescoping the extension 23 and the base piece 22, and the upright 5 is reduced to its minimum size by telescoping the extension 15 and the base portion 11 and by folding the brace 13 against the base portion.

I have illustrated my invention as applied to an automobile, and both the upright 5, its connecting brace 13 and the member 8 are curved near the bottom to conform to the contour of the top bow sockets or the body portion of the automobile.

I contemplate employing my apparatus on both sides of the automobile. The member 8 may be used interchangeably on either side of the car, and the upright 5 may be made in pairs by securing the brace 13 on opposite sides of the base portions 11. The apparatus illustrated may be employed with a backwardly opening or left handed door by simply securing the brace 13 to the other side of the upright 5. The upright 5 and the member 8 are made preferably of steel and are constructed, so that they are light and so that they will not take up much room. I preferably make the base portions of the support members of soft or malleable metal, so that the support members may be bent and shaped to conform to the contour of the top bow sockets, or body of any automobile or vehicle.

What I claim is:

1. The combination of a vehicle door, an upright member, a clamp securing said member to the door in transverse vertical alinement with free edge of the door, and a brace engaging the upright member and the door.

2. In combination with a vehicle door, a removable curtain, a member for engaging the edge of the vehicle curtain, an adjustable clamp secured thereto for engaging the vehicle door and for removably mounting said member on said door, a brace pivotally secured to said member, and an adjustable clamp secured to said brace for engaging the vehicle door.

3. In combination with a vehicle door, a removable curtain, an upright member, an adjustable clamp secured thereto for engaging the edge of the vehicle door, and an extension adjustably mounted on said member, and means mounted on said member and on said extension for engaging the edge of a curtain.

4. In combination with a vehicle door, a curtain, an upright, an adjustable clamp secured thereto for engaging the edge of the vehicle door and removably mounting said member in place on said door, a brace pivotally secured to said member, an adjustable clamp for engaging the edge of the door secured to said brace, an extension adjustably mounted on said upright member, and means on said member and said extension for engaging the edge of the curtain.

5. A removable support for automobile curtains, comprising an upright capable of being bent to conform with the contour of the automobile top bow sockets, an adjustable clamp secured thereto and adapted to engage the automobile door and to secure said upright in place, and an adjustable extension mounted on said upright.

6. A removable support for automobile curtains, comprising a base portion capable of being bent to conform with the contour of the automobile top bow sockets, an adjustable clamp for securing said upright to the door of the automobile, a brace secured to said upright and capable of being bent to correspond with the contour of the top bow sockets, and an adjustable clamp secured thereto for securing said brace to said door.

CHARLES C. BLACKMORE.

Witnesses:
 WALTER F. MURRAY,
 B. R. KROPF.